United States Patent [19]

Ruben

[11] 4,140,840

[45] Feb. 20, 1979

[54] LEAD-SULFURIC ACID STORAGE BATTERY AND GRID THEREFOR

[76] Inventor: Samuel Ruben, 52 Seacord Rd., New Rochelle, N.Y. 10804

[21] Appl. No.: 821,648

[22] Filed: Aug. 4, 1977

Related U.S. Application Data

[63] Continuation-in-part of Ser. No. 801,912, May 31, 1977, abandoned.

[51] Int. Cl.$^2$ .............................................. H01M 4/68
[52] U.S. Cl. ................................... 429/190; 429/204; 429/241; 429/245
[58] Field of Search ............... 429/241, 242, 245, 190; 428/648; 204/435

[56] References Cited

U.S. PATENT DOCUMENTS

| | | | |
|---|---|---|---|
| 2,679,547 | 5/1954 | Fischbach et al. | 429/241 |
| 3,798,070 | 3/1974 | Ruben | 429/245 |
| 3,870,563 | 3/1975 | Ruben | 429/245 |
| 4,033,835 | 7/1977 | Lerner et al. | 204/43 S |

FOREIGN PATENT DOCUMENTS 689003  3/1953  United Kingdom ..................... 429/245

*Primary Examiner*—Donald L. Walton

[57] ABSTRACT

A lead-sulfuric acid storage battery in which one or both of the grids supporting the cathodic and anodic reactants comprises a base of iron, nickel or an alloy thereof, having a coating of tin-nickel alloy with a layer of lead thereover.

11 Claims, No Drawings

LEAD-SULFURIC ACID STORAGE BATTERY AND GRID THEREFOR

This application is a continuation in part of my copending application Ser. No. 801,912, filed May 31, 1977, now abandoned, entitled "Low Internal Resistance Lead-Acid Storage Battery".

This invention relates to lead-sulfuric acid storage batteries and particularly to the metal grids which support the cathodic and anodic reactants of such batteries. One or both of the grids has a coating which renders it resistant to attack by the sulfuric acid.

An object of the invention is to eliminate the lead grid as the supporting base for the cathodic and anodic reactants in lead-sulfuric acid batteries.

A specific object is the reduction in weight of such batteries.

One of the limitations on the use of storage batteries to power electric vehicles, has been the high weight of the supporting lead grid.

Heretofore the use of metals such as iron, nickel, or their alloys, such as stainless steel, etc. as grid supports for either or both negative and positive electrodes, has not been practical, due to eventual reaction with the sulfuric acid electrolyte.

I have found that grids formed from these metals, plated with a porefree tin-nickel alloy having an overall integral coating of lead thereover, may be advantageously employed as the grid supports for the cathodic and anodic reactants in lead-acid storage batteries without attack by the sulfuric acid. The cathodic reactant will have a lead peroxide layer over the lead coating and the anodic reactant will have a porous electroformed layer of lead over the lead coating. The tin-nickel coating is an alloy and consists preponderantly of tin, for example 65% tin and 35% nickel.

When assembled into a cell with a sulfuric acid electrolyte, preferably gelled, there is no adverse reaction with or dissolution of the grids in the electrolyte.

The grid is preferably made with expanded metal such as the type described in my U.S. Pat. No. 3,870,563 "Hermetically Sealed Storage Battery" or the screen type described in my co-pending application Ser. No. 801,912.

Because expanded metal or screen type grids may be employed instead of heavy lead grid structures, the described grids permit a substantial reduction in weight of batteries, as compared with conventional storage batteries.

The tin-nickel alloy can be plated on the expanded metal or screen to provide a hard non-porous integrally bonded layer, which is then desirably further coated with a lead plate. The lead plating is particularly advantageous for maximum cycle life of the cell and is necessary on the positive electrode where it is in contact with lead peroxide.

I have found that without the non-porous tin-nickel coating, lead plating alone on the metal, because of its porosity, is inadequate to prevent dissolution into the electrolyte from the positive electrode. The tin-nickel alloy provides a pore-proof, acid resistant base for application of a lead plate and subsequent lead oxide or porous electroformed lead coating.

The preferred electrode utilizes a 0.010 inch thick metal, such as Stainless Steel #304, expanded and stretched to a diamond-shaped pattern of 0.060 inch overall thickness. In a typical screen type grid, the horizontal wires are 0.39 mm in thickness and the vertical wires are 0.56 mm thick. There are 18 wire strands in the horizontal direction to 6 wire strands in the vertical direction.

Where iron, steel or nickel is used, it may be desirable to apply a flash coating of copper, silver, nickel or cobalt to the grid before plating the tin-nickel alloy. When Stainless Steel is used, a flash coating of nickel is applied before applying the tin-nickel plate.

In the preparation of the grids, the expanded metal is suspended in a tin-nickel bath composed of 48 grams per liter (48 g/l) of stannous chloride (Sn Cl$_2$), 295 grams per liter (295 g/l) of nickel chloride (Ni Cl$_2$ . 6 H$_2$O) and 54 grams of ammonium bi-fluoride per liter (54 g/l) to a solution temperature of 150° F. For an expanded metal or screen area of approximately 100 cm$^2$, a current of 250 ma is applied for 45 minutes, to produce hard, dense, pore-free tin-nickel alloy coating. The alloy plate has a composition of approximately 65% tin and 35% nickel.

The pH of the solution should be maintained in the range of 2.0 to 2.5 by the addition of ammonium hydroxide. The nickel and tin content is maintained by the nickel and tin electrodes and the addition of stannous chloride. The electrodes should be bagged in Nylon.

After the grids, such as flash nickel plated #304 Stainless Steel, have been coated with the tin-nickel alloy, they are lead plated in a lead fluorborate solution, a current of 4 ampere being applied for 1 hour for a screen approximately 10 × 10 cm.

The positive electrode lead plated metal grid is then coated with a lead oxide paste, (70 grams when dry) made by mixing together and grinding 72 grams of N.L. Industries #25B (25% Pb$_3$O$_4$/75% PbO) and 8.0 cc 6% by volume H$_3$PO$_4$ (7.1 cc. 85% H$_3$PO$_4$/92.9cc H$_2$O). 6.4 ml of 1.400 s.g. H$_2$SO$_4$ is slowly added to the mix, as well as 7 to 8 ml of H$_2$O to make the mix more spreadable. The coated positive grids are placed in an airtight humidifying container to avoid premature drying of the coating and are stacked with separating strips of polyethylene and kept in an oven for 5 days. They are then dried in a 60° C. oven for 12 hours so that they contain less than 5% residual moisture after drying.

The negative electrode grid of Stainless Steel having a flash coating of nickel with a tin-nickel alloy plate over the nickel, and which is preferably lead plated, is coated with 60 g (when dry) of a paste made by thoroughly mixing 72.0 g. of N.L. Industries Universal Grenax (lead oxide) and 2% KK Expander, after which 6.4 ml of 1.300 s.g. H$_2$SO$_4$ containing 6% by volume of H$_3$PO$_4$ is slowly added. The coated grids as described are then electroformed in 1.070 s.g. H$_2$SO$_4$ to their respective reactants, PbO$_2$ on the positive electrode and porous Pb on the negative electrode.

Preferably a gel type of sulfuric acid electrolyte is used in an encapsulated cell structure, generally as described in my U.S. Pat. No. 3,870,563. When stainless steel is used as the grid material, it is desirable for shelf life maintenance, to add a small amount of titanyl sulfate to the sulfuric acid electrolyte. This renders the stainless steel passive to sulfuric acid and provides protection against inadvertent exposure to the acid. A minor proportion by weight of titanyl sulfate is dissolved in the sulfuric acid, in a sufficient quantity to inhibit dissolution in the electrolyte of the stainless steel. For practical purposes 1 to 10 grams of titanyl sulfate may be added to 300 ml of acid. In a typical electrolyte, the addition of the titanyl sulfate to the sulfuric acid raises the specific gravity from 1.300 to 1.302. The gel electrolyte is made by adding 10 grams of Cab-O-Sil (fumed silica product of Cabot Corporation, Boston) to 600 ml of 1.300 s.g. $H_2SO_4$ to form a silica gel, the electrolyte being made at least 24 hours before assembly of the battery.

In this structure, thin sheets of unwoven glass cloth coated with the gel electrolyte are placed in contact with the positive electrodes and a 2.3 mm thick 3 mm wide polyethylene frame 9.9 cm × 10.95 cm. The frame has 3 open sections for holding the gel electrolyte which is confined within the open areas of the frame, the walls of which prevent squeezing out or loss of electrolyte when the assembly is compressed and encapsulated. The electrolyte permeates the glass cloth spacers and is in intimate adhering contact with the negative electrodes. The cell assembly comprises two positive electrodes separated by the gel filled unwoven glass cloth spacers and electrolyte filled frames. Sheets of untreated glass cloth adjacent to the two outer negative electrodes, serve as compressible and absorbent end members. The assembly is tightly wrapped and enclosed in vinylindene chloride (Saran) film, the wrapping being taped with "Scotch" brand tape to close any open areas and complete the sealing of the cell. Contact tabs extend upward from the assembly, with two positive tabs at one end of the unit and three negative tabs at the opposite end.

For a 6 volt battery, 3 of the cells are assembled in a compartmentized plastic case with connections for series operation. The units are then encapsulated with a mixture of equal parts of E.S.B.E.-21 fast curing epoxy resin A and B, preheated to 40°. Some of the epoxy mixture is poured into the bottom of the compartment to a depth of about ½ cm and allowed to harden. Epoxy mixture is then poured into each compartment, followed immediately by insertion of each cell section, permitting the fluid epoxy to fill in around and over the units. Sufficient epoxy is then added to bring the level about 1 cm above the level of the cell inter-connections to effect a hermetic seal. To insure complete sealing, an additional layer about ½ cm thick may be added, following curing of the encapsulating epoxy. During encapsulation, and due to the exothermic reaction of the epoxy resin as it hardens, the elevated temperature of the immersed unit will cause displacement and discharge of air and occluded gases until the resin hardens and seals.

Other types of structures may be employed and the grids of this invention may be used for anode and cathode supports in primary cells as well as in the secondary cells.

I claim:

1. A lead-sulfuric acid electric current producing cell having grids supporting the cathodic and anodic reactants of said cell, at least one of said grids comprising a base of one of the metals iron, nickel, stainless steel, and alloys of iron and nickel, said base having a coating of tin-nickel alloy.

2. The cell of claim 1 characterized in that said base is expanded stainless steel.

3. The cell of claim 1 characterized in that the composition of the tin-nickel alloy coating is approximately 65% tin and 35% nickel.

4. The cell of claim 1 characterized in that a thin plating of copper, silver, or nickel is interposed between the metal base and the tin-nickel alloy coating.

5. A storage battery having an electrolyte of sulfuric acid, a cathodic reactant of lead peroxide supported on a grid composed of one of the metals stainless steel, iron, nickel, alloys of nickel and iron, said grid having a coating of tin-nickel alloy thereon with a layer of lead thereover, and an anodic reactant of lead.

6. A storage battery having an electrolyte of sulfuric acid, an anode comprising a grid composed of one of the metals stainless steel, iron, nickel, and alloys of nickel and iron, having a coating of tin-nickel alloy thereon, a layer of lead over said tin-nickel alloy coating, and a deposit of electroformed lead over said lead plating.

7. A storage battery having an anode comprising a grid of stainless steel having a thin layer of nickel thereover, a coating of tin-nickel alloy on said nickel, a plating of lead over said tin-nickel alloy coating, a deposit of electro-formed lead over said lead plating and an electrolyte of sulfuric acid containing a minor amount of titanyl sulfate dissolved therein.

8. An electric storage battery having metal grids supporting cathodic and anodic reactants, the positive grid being formed from a metal selected from the group consisting of stainless steel and iron, nickel and their alloys, said negative grid having a pore-free plating of tin-nickel alloy thereover, a lead plating over said tin-nickel alloy plate and an electroformed layer of porous lead over said lead plate constituting the negative reactant, the positive grid having an outer layer of lead peroxide constituting the cathodic reactant, a gelled electrolyte of sulfuric acid, and an encapsulating epoxy resin hermetically sealing said battery.

9. A grid support for anodic and cathodic reactants in lead-sulfuric acid electric current producing cells comprising a base of a metal selected from the group consisting of stainless steel and iron, nickel and their alloys said metal having a pore-free coating of tin-nickel alloy and a layer of lead over said tin-nickel.

10. The grid support of claim 9 characterized in that a thin layer of one of the metals copper, silver, nickel and cobalt is interposed between the base and the tin-nickel alloy coating.

11. An electric current producing cell having positive and negative electrodes, an electrolyte of sulfuric acid, at least one of said electrodes being composed of iron having a coating of tin-nickel alloy thereon and a layer of lead thereover.

* * * * *